Sept. 15, 1942.　　　　　D. P. TUCKER　　　　　2,295,615
FREQUENCY MEASUREMENT AND CONTROL
Filed July 15, 1941　　　4 Sheets-Sheet 1

INVENTOR
DUNDAS P. TUCKER
BY
ATTORNEY

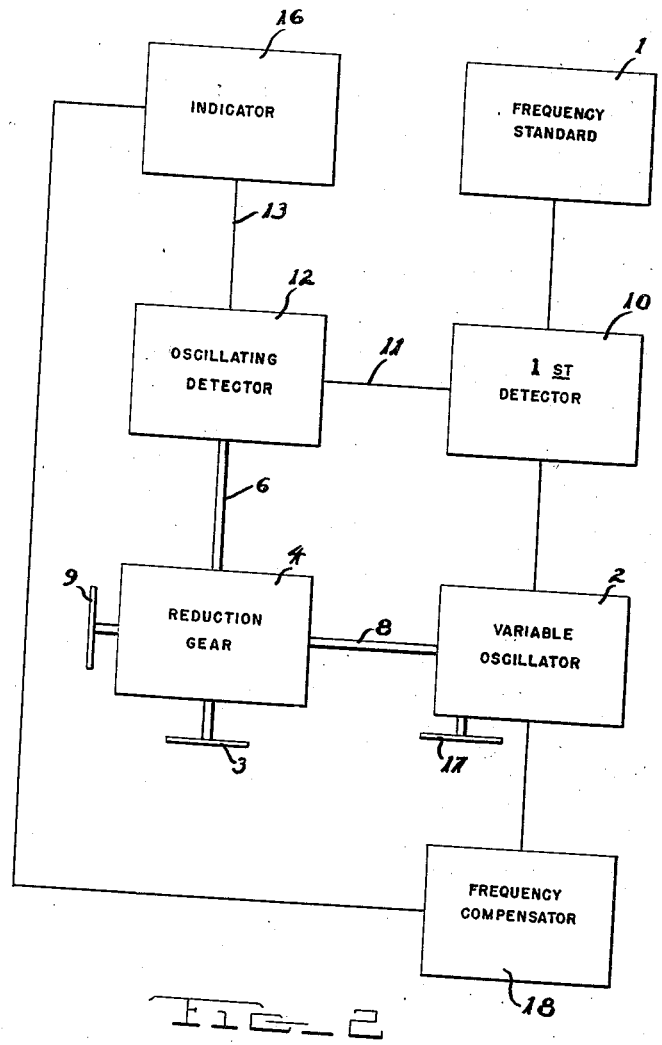

Sept. 15, 1942.    D. P. TUCKER    2,295,615
FREQUENCY MEASUREMENT AND CONTROL
Filed July 15, 1941    4 Sheets-Sheet 3
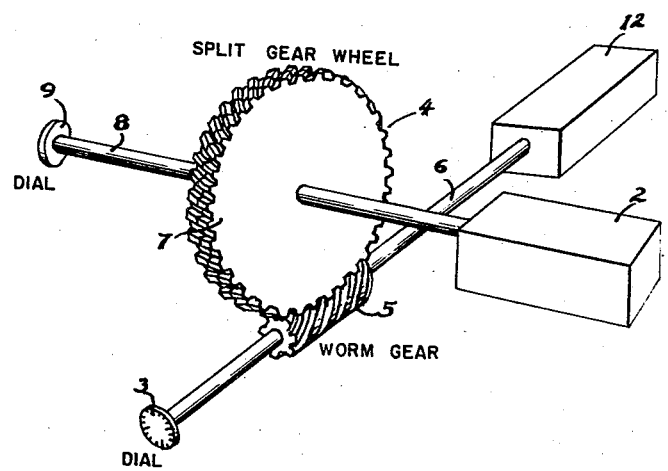
FIG_3
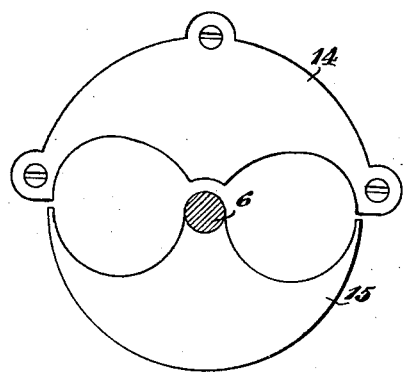
FIG_4
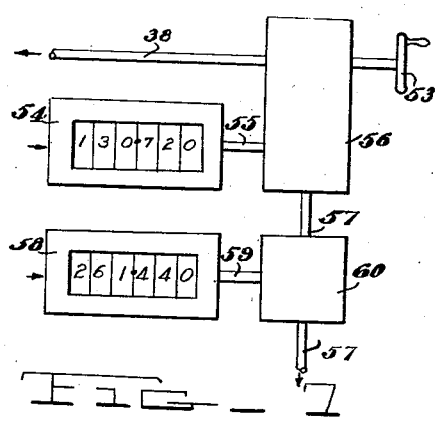
FIG_7
INVENTOR
DUNDAS P. TUCKER
BY
ATTORNEY

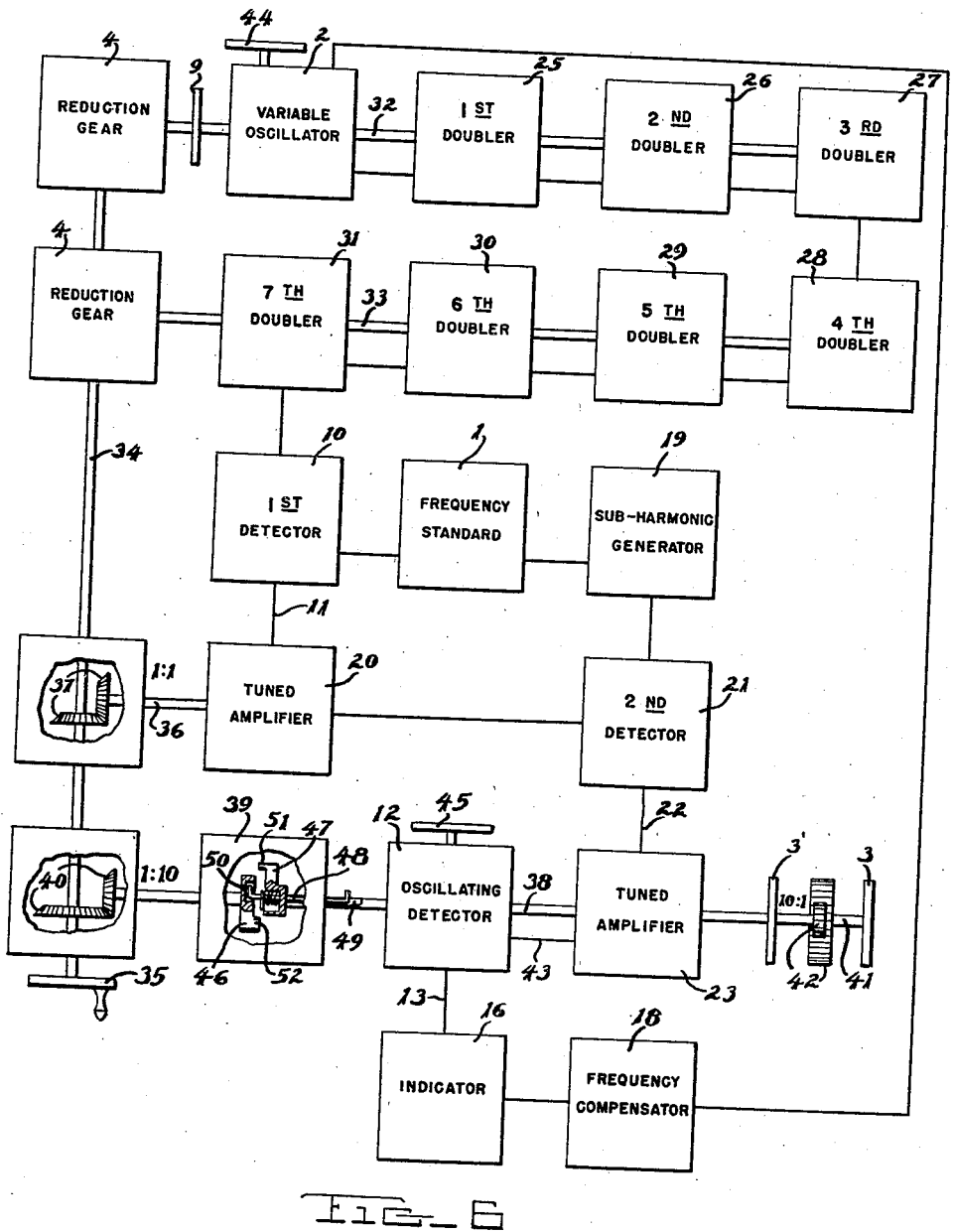

Patented Sept. 15, 1942

2,295,615

UNITED STATES PATENT OFFICE 2,295,615

FREQUENCY MEASUREMENT AND CONTROL

Dundas Preble Tucker, United States Navy

Application July 15, 1941, Serial No. 402,555

11 Claims. (Cl. 250—36)

(Granted under the act of March 3, 1883, as amended April 30, 1928; 370 O. G. 757)

My invention relates broadly to the measurement of the frequency of and the control of alternating or pulsating electric currents.

My invention relates chiefly to circuit arrangements and devices for the precise measurement and precise control of the frequency of an alternating electric current with respect to the frequency of another alternating electric current used as a reference standard.

One of the objects of my invention is to provide a means for quickly, simply and accurately measuring the frequency of an alternating current of any frequency using any other known frequency as a standard of reference.

Another object of my invention is to provide a means for determining quickly and precisely when the output frequency of a variable frequency oscillator reaches a predetermined and desired frequency.

A further object of my invention is to provide a means for determining and controlling the output frequency of a variable frequency source over a wide frequency range by determining and controlling the output frequency over a small portion of its frequency range.

Still another object of my invention is to provide a source of alternating electric current whose frequency is continuously variable over a very wide range and which can be quickly and accurately set and maintained to any predetermined frequency within its designed range.

Other objects and many of the attendant advantages of this invention will be readily appreciated as the same becomes better understood by reference to the following detailed description when considered in connection with the accompanying sheets of drawings wherein:

Fig. 3 is an isometric view of a reduction gear that may be used in the embodiment of my invention depicted in Fig. 2;

Fig. 4 shows a type of capacitor that is suitable for use in the beat frequency detector or amplifier of the apparatus of the present invention;

Fig. 5 shows a graph of the frequency variation produced in the beat frequency detector or amplifier in which the capacitor of Fig. 4 has been incorporated;

Fig. 6 shows schematically another embodiment of my invention which provides a source of alternating current of wide frequency range, high accuracy and high degree of frequency stability; and Fig. 7 shows a preferred frequency indicating arrangement that may be employed in the embodiment of Fig. 6.

Means for precisely determining the frequency of a continuously variable electric oscillator at one or more discrete points within its designed frequency range are well known to the art. One is by the use of a piezo-electric crystal whose frequency of oscillation is accurately known and which is used as a comparison standard for the variable oscillator. The frequency of the variable oscillator is compared with that of the crystal standard or its harmonics and adjusted until the two frequencies are equal.

Where it is desired to adjust or to measure the frequency of a variable oscillator at a value which is different from any frequency available from the frequency standard, two methods known to the art may be used. One method uses mathematical interpolation and the other measures the difference in frequency produced by heterodyning the variable oscillator frequency with that of the fixed standard. The mathematical interpolation method is based on a variable oscillator design in which the frequency of the oscillator is a linear function of the position of the frequency controlling element with respect to a reference point on a scale. Therefore, when the scale readings of two standard frequencies, one above and one below the desired frequency are known, the scale setting for the desired frequency may be calculated by proportion. The accuracy of such a method is dependent upon the degree of linearity of the frequency controlling element, the amount of mechanical play in the control system, the accuracy of the mathematical computation, and several other factors, both human and mechanical. In practice, the combined effect of these errors may prove both large and unpredictable.

Figure 1:
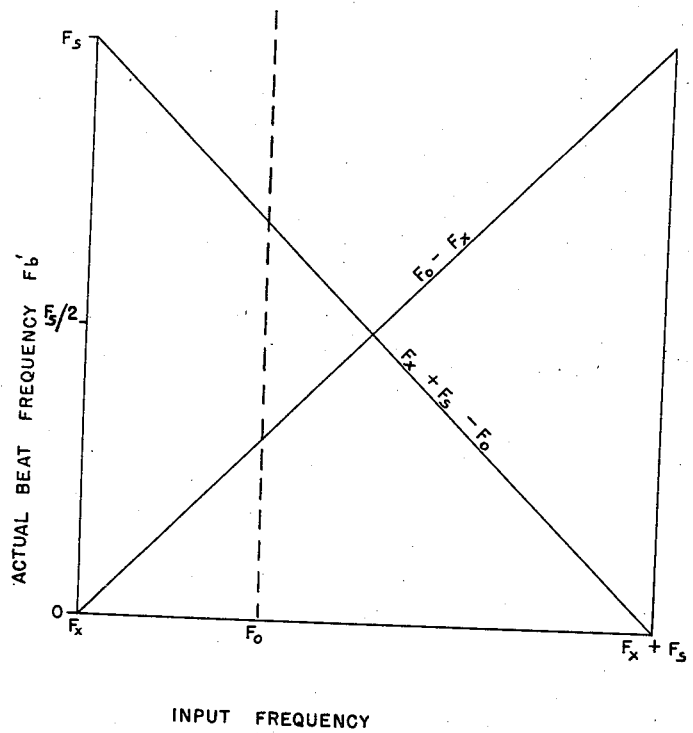
Fig. 1 shows in graph form a heterodyne or modulator principle which is one of the basic features of my invention.

Fig. 1 shows graphically some of the frequencies involved when the heterodyne method is used. $F_x$ represents the lower standard reference frequency, $F_s$ the difference between $F_x$ and the next higher standard reference frequency, and $F_o$ the frequency of the variable oscillator. As is well known to the art, if two sinusoidal alternating voltages of frequencies $F_x$ and $F_o$ are simultaneously introduced into a circuit in which the resistance is a non-linear function of the impressed voltage or current, additional heterodyne beat voltages whose frequencies are $(F_o-F_x)$, $(F_o+F_x)$, and various higher order harmonics of $F_x$ and $F_o$ are present in the circuit. The line "$F_o-F_x$" in Fig. 1 is a plot in rectangular coordinates of the value of the inferior beat frequency between $F_o$ and $F_x$ with respect to the variations of $F_o$ between the values $F_x$ and $F_x+F_s$. Similarly, the line "$F_x+F_s-F_o$" is a plot of the value of the beat frequency produced between the frequencies $F_o$ and $F_x+F_s$ for the same variations of the value of $F_o$. From Fig. 1, it can be seen that for any value of $F_o$ between those two limits, two beats are produced, the sum of which always equals $$F_s(F_x+F_s-F_o+F_o-F_x=F_s)$$

and one of which always lies within the range $F_s/2$ to $F_s$. Therefore, as $F_o$ increases from the value $F_x$ to $F_x+F_s$, the higher beat frequency goes from $F_s$ to $F_s/2$ and back up to $F_s$ again. Likewise, the lower beat frequency goes from 0 to $F_s/2$ and back down to 0 again. Therefore, the frequency of $F_o$ may be determined when the value of $F_x$ and that of either one of the beats is known; the error of such determination being the algebraic sum of the errors of $F_x$ and the error of measurement of the beat frequency.

The heterodyne method described above is subject to personal error because of the ambiguity involved with two or more beats always present in any circuit which has more than one standard reference frequency present at the same time. Unless the operator knows the frequency of $F_o$ with a considerable degree of accuracy, he may measure the wrong beat frequency and obtain a large error. He may also add the value of the beat frequency incorrectly to the value of $F_x$.

Figure 2:
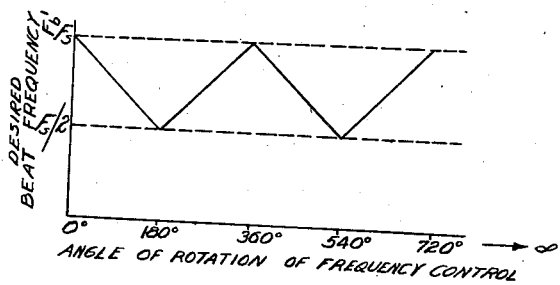
Fig. 2 shows schematically one embodiment of my invention which provides a source of alternating current that is accurate and constant as to frequency.

In accordance with the present invention, this ambiguity and chance of mathematical error are removed by the use of the basic arrangement schematically depicted in Fig. 2. The elements and particular devices used are intended to be illustrative and not restrictive. Other means for performing any of the same functions may be used in each case. In Fig. 2 the reference character 1 designates a fixed frequency standard of conventional design whose fundamental frequency may be several orders below the frequency range of the continuously variable oscillator 2, also of conventional design. It is to be understood that the frequency standard 1 may include a harmonic generator and even an amplifier for the higher order harmonics so as to make available harmonics as high as 200 or more for heterodyning purposes. By using the harmonics of the reference standard 1, numerous and equidistantly spaced check frequencies are provided within the frequency range of the variable oscillator 2.

The frequency of the variable oscillator 2 is controlled by the dial 3 through the reduction gear 4 to be described more in detail hereinafter. The frequency variation of the oscillator 2 is closely linear with respect to the angular rotation of the dial 3. This linear variation of frequency is accomplished in any of numerous ways well known to the art, such as by use of a properly designed variable capacitor in the frequency determining circuit of the vacuum tube oscillator. For convenience, the gear ratio of the reduction gear 4 is taken such that one complete rotation of the dial 3 changes the frequency of the oscillator 2 by an amount equal to the frequency difference between adjacent check frequencies of the frequency standard 1. Other gear ratios, however, may also be used.

A preferred construction of the reduction gear 4 is shown in Fig. 3 of the drawings as comprising a conventional worm gear drive in which the worm 5 on the shaft 6 to which the dial 3 is secured meshes at right angles with a conventional split gear 7 mounted on the shaft 8. The use of a split gear wheel considerably minimizes backlash. To the shaft 8 are secured the dial 9 and the frequency control element of the variable oscillator 2 such as the rotor of a variable capacitor. The rotor is adjustably secured to the shaft 8 to facilitate calibration of the oscillator 2, as will be pointed out more in detail hereinafter. The pitch of the worm 5 is matched to the diameter and teeth of the gear wheel 7 so that one complete revolution of the dial 3 rotates the shaft 8 and the rotor of the variable capacitor secured thereto through an angular distance to cause the frequency $F_o$ of the variable oscillator 2 to change by an amount $F_s$ where $F_s$, as previously noted, is the difference in frequency between any two adjacent check frequencies of the frequency standard. Thus, when the dial 3 reads zero $F_o$ of the variable oscillator 2 should coincide with a check frequency of the reference standard 1 as indicated by the dial 9 and one revolution of dial 3 to zero again should vary $F_o$ linearly to the next check frequency of the reference standard.

Dial 3 is calibrated linearly in subdivisions of the interval between check frequencies which interval is designated $F_s$ to conform with the notation of Fig. 1. Dial 9 is calibrated directly in check frequencies for the full range of the variable oscillator 2 and together with dial 3 indicates the frequency of the variable oscillator. Such indication, however, is subject to any errors due to mechanical backlash of the reduction gear 4, non-linearity of the frequency controlling element of the variable oscillator 2 and oscillator drift.

In order, therefore, to detect any difference between the actual frequency of the variable oscillator 2 and the desired frequency of this oscillator as indicated by the setting of dials 3 and 9, I heterodyne the output of the variable oscillator 2 with that of the frequency standard 1 to produce a first beat frequency. This first beat frequency is in turn heterodyned with a frequency known to be the frequency difference between the desired frequency of the variable oscillator 2 as indicated by the dials 3 and 9 and the frequency of the reference standard 1 to produce a second beat frequency. If this second beat frequency is zero, it is known that the actual frequency of the variable oscillator 2 is that indicated by the setting of the dials 3 and 9. If, on the other hand, this second beat frequency is not zero, it is immediately known that the actual frequency of the variable oscillator 2 differs from the desired frequency of this oscillator, as indicated by the setting of the dials 3 and 9. Coincidence between the actual and the desired frequencies of the variable oscillator 2 can thereupon be easily established by adjusting the second beat frequency to a zero value.

The foregoing will become clear from a further consideration of Fig. 2 in which the reference character 10 designates a frequency converter such as a detector of conventional design in which the generated frequencies of the variable oscillator 2 and of the reference standard 1 are heterodyned and in the rectified output 11 of which there is produced the first beat frequency $F_b'$ (actual). As the frequency $F_o$ of the variable oscillator 2 varies from one check frequency of the reference standard 1 to the next check frequency by manipulation of the dial 3 through one complete revolution from one zero setting to the next, the lower beat frequency in the rectified output 11 will vary from 0 to $F_s/2$ and back again to 0 while the higher beat frequency will vary from $F_s$ to $F_s/2$ and back to $F_s$, all as pointed out hereinbefore in connection with Fig. 1. Either of these first beat frequencies $F_b'$ (actual) in the rectified output 11 of the detector 10 is heterodyned with a frequency in the tuned circuit of the detector 12 to produce a second beat frequency $F_b''$ in the rectified output 13 of this latter detector.

This heterodyning frequency in the tuned circuit of the detector 12 is known to be the frequency difference between the desired frequency of the variable oscillator 2 as indicated by the dials 3 and 9 and the frequency of the reference standard 1. Otherwise stated, this heterodyning frequency in the tuned circuit of the detector 12 is the desired beat frequency that would be obtained by heterodyning the frequencies produced in the variable oscillator 2 and the reference standard 1 if the frequency of the variable oscillator 2 were identical with the frequency indication of the dials 3 and 9. For convenience of exposition, therefore, this heterodyning frequency in the tuned circuit of the detector 12 will be designated $F_b'$ (desired). Thus, by heterodyning the first beat frequency $F_b'$ (actual) in the output circuit 11 of the detector 10 with the frequency $F_b'$ (desired) in the tuned circuit of the detector 12 there is produced the second beat frequency $F_b''$ in the output 13 of the detector 12 which provides a ready means for checking and adjusting the frequency of the oscillator to the desired value.

The manner in which the desired heterodyning beat frequency $F_b'$ (desired) is produced in the tuned circuit of the detector 12 will now be explained. The device 12 may be either a conventional detector combined with a separate variable oscillator to produce the desired heterodyning frequency in the tuned circuit of the detector or, as indicated, may be a variable oscillating detector of a conventional type in which the desired heterodyning frequency is produced. The tuning control element of the detector 12 which adjusts the heterodyning frequency is designed and associated with the shaft 6 in such a manner that one revolution of the dial 3 causes the heterodyning frequency to vary linearly through one cycle of the desired beat frequency $F_b'$ (desired), where this frequency as already noted is the beat frequency between the desired frequency of the oscillator 2 as indicated by the dials 3 and 9 and the frequency of the reference standard 1. The design of the oscillating detector in any event is such as to produce a linearly varying heterodyning frequency of great stability.

A preferred construction of the tuning control element of the oscillating detector 12 to obtain the desired cycle of linear frequency variation in the heterodyning beat frequency is disclosed in Fig. 4. I do not desire to limit myself to this construction, however, since any construction whether inductive or capacitive may be employed that will give the desired frequency variation. The frequency control element is depicted in Fig. 4 as a variable capacitor and as including the stator 14 and the rotor 15. The rotor 15 is fixedly secured to the shaft 6 in operation but is adjustable with respect thereto for establishing the correct relation between the dial 3 and the rotor 15 in the calibration of the apparatus. The stator and rotor plates 14 and 15 are designed such that the capacity increases to 180° and decreases from thence to 360° and such that capacity changes are proportional to the square of the angular displacement of the rotor 15. When the condenser depicted in Fig. 4 is then incorporated in an oscillatory circuit of the detector 12 with a fixed inductance, the change of the resonant frequency of the circuit will be linear with respect to the angular rotation of the shaft 6.

With the stator 14 and rotor 15 positioned as indicated in Fig. 4 the capacitance of the condenser will be a minimum. This position of the rotor 15 may thus correspond to its 0° position. As the rotor 15 is gradually turned from this position its capacitance increases in accordance with a square law and will be a maximum when the rotor has been turned through an angle of 180° from its initial position. Further rotation of the rotor 15 from the 180° position results in a progressive square law decrease of capacity until the 360° or 0° position is again reached when the capacitance will again be a minimum. The frequency of the tuned circuit of the oscillating detector in which this variable capacitor is incorporated thus decreases linearly from a maximum to a minimum as the rotor 15 is turned from its 0° position to its 180° position; and increases in a linear manner from this minimum frequency back to its maximum frequency as the rotor 15 is turned from its 180° position to its 360° position.

The variable capacitor depicted in Fig. 4 is designed in relation to the constants and stray capacities of the oscillatory circuit in the detector 12 so as to produce a cycle of frequency variation varying linearly from $F_s$ to $F_s/2$ as the rotor 15 turns from its 0° position to its 180° position and varying linearly from $F_s/2$ to $F_s$ as the rotor 15 is turned from its 180° position to its 360° position. This is clearly indicated in Fig. 5 of the drawings and is a feature of great importance in the present invention. Any frequency in the cycle of frequency variation depicted in Fig. 5 is the desired beat frequency $F_b'$ (desired) that would be obtained by heterodyning the frequencies produced in the variable oscillator 2 and reference standard 1 if the frequency of the oscillator 2 were identical with the frequency indications of the dials 3 and 9. The desired beat frequency $F_b'$ (desired) of Fig. 5 is to be distinguished from the actual beat frequency $F_b'$ (actual) of Fig. 1 obtained from heterodyning the possibly erroneous frequencies of the variable oscillator 2 and the frequency of the reference standard 1 in the detector 10.

While the variable capacitor of Fig. 4 is designed to give a cycle of frequency variation in the oscillatory circuit of the detector 12 that corresponds to and will heterodyne with the higher beat frequency in the rectified output 11 of the detector 10 this is not essential since the design of the variable capacitor might instead be such as to produce a cycle of frequency variation for heterodyning with the lower beat frequency of the detector 10. In this connection it may be noted that the lower beat frequency in the rectified output 11 of the detector 10 in the present construction is considerably attenuated in the tuned circuit of the oscillating detector 12 and hence does not interfere with the successful operation of the apparatus depicted in Fig. 2.

As noted hereinbefore the first beat frequency $F_b'$ (actual) in the rectified output 11 of the detector 10 is heterodyned with the desired beat frequency $F_b'$ (desired) in the tuned circuit of the oscillating detector 12 to produce a second beat frequency $F_b''$ in the output 13 of this latter detector when the actual frequency of the variable oscillator 2 differs from its desired frequency, as indicated by the dials 3 and 9. Any suitable indicator 16 may be employed in the output of the detector 12 for detecting any difference between the desired beat frequency $F_b'$ (desired) and the actual beat frequency $F_b'$ (actual). Thus, by way of illustration, the indicator 16 may be an audible indicator such as a pair of head phones or a visual indicator such as a meter.

Before using the apparatus of Fig. 2 it is first adjusted in a manner to be noted presently. Dial 3, as already explained, is calibrated linearly in subdivisions of the interval between check frequencies of the reference standard 1 while dial 9 is calibrated directly in check frequencies of the reference standard for the full range of the variable oscillator 2 and together with dial 3 indicates the desired frequency of the variable oscillator. With the dial 3 adjusted to read zero the frequency controlling elements in the oscillatory circuits of the variable oscillator 2 and oscillating detector 12 are adjusted with reference to their respective shafts 8 and 6 to cause the frequency of the oscillator 2 to coincide with a check frequency of the reference standard and to cause the desired beat frequency $F_b'$ (desired) of the detector 12 to coincide with the actual beat frequency $F_b'$ (actual) in the output circuit of the detector 10. Coincidence between these two beat frequencies is indicated by the device 16.

With the apparatus constructed and adjusted in the manner heretofore described the higher beat frequency $F_b'$ (actual) of Fig. 1 in the output of the detector 10 will coincide and track with the desired beat frequency $F_b'$ (desired) of Fig. 5 in the detector 12 as dial 3 is turned through successive revolutions, provided the frequency of the variable oscillator 2 is that indicated by the dials 3 and 9. Under these circumstances the beat frequency $F_b''$ in the output 13 of the oscillating detector will be zero and the device 16 will not give an indication. Should the actual frequency of the variable oscillator 2, however, be different from the desired frequency of the oscillator as indicated by the dials 3 and 9, this will be immediately evidenced by an indication of 16 since the beat frequency $F_b''$ now has a value other than zero. Coincidence between the actual and desired frequencies of the oscillator 2 can thereupon be established in any suitable manner as by the manipulation of the dial 17 which controls a conventional trimmer in the frequency controlling circuit of the oscillator 2. This insures that the actual frequency of the variable oscillator 2 is precisely that indicated by the dials 3 and 9 to a degree of accuracy governed by the accuracy of the reference standard 1, the accuracy of the oscillating detector 12 and that of the indicator 16.

The following numerical example serves to illustrate quantitatively the factors involved in the operation of the apparatus of Fig. 2, one method of operation, and the order of precision to be expected. Let it be assumed that the reference standard 1 produces a fundamental frequency of 10,000 cycles and all harmonics thereof up to 2,000,000 cycles with an accuracy of ±1 in 1,000,000 cycles; that the variable oscillator 2 has a range from 1,000,000 to 2,000,000 cycles; that the oscillating detector 12 has a range from 5,000 to 10,000 and an error of ±5 cycles over its range after being checked and adjusted to agree with the reference standard 1; and that the indicator 16 is capable of indicating frequency agreement within ±.10 cycle. Since the difference between adjacent check frequencies of the reference standard 1 is 10,000 cycles it will be noted that the frequency variation of the oscillating detector 12 is between 5,000 and 10,000 cycles which corresponds to the frequency range of the higher beat frequency in the output of the detector 10.

It is desired to set the variable oscillator to a frequency of 1,978,540. Dials 3 and 9 are, therefore, turned so as to indicate the desired frequency. This is conveniently accomplished by first adjusting the dial 9 to a check frequency of 1,970,000 and thereafter adjusting the dial 3 to a frequency of 8,540 cycles. At this setting of the dials 3 and 9 the oscillating dectector 12 will be tuned to a frequency of 8,540 cycles, namely, the desired beat frequency $F_b'$ (desired), which is the difference between the indications of the dials 3 and 9 and the nearest usable check frequency of 1,970,000 cycles of the reference standard. However, due to various causes previously enumerated, the frequency of the variable oscillator 2 is actually 1,977,364 cycles which is an error of −1,176 cycles. Therefore the actual higher beat frequency $F_b'$ (actual) produced in the output 11 of the detector 10 between the nearest check frequency of 1,970,000 is 7,364 cycles, namely 1,977,364−1,970,000.

The higher beat frequency $F_b'$ (actual) of 7,364 cycles in the output of the detector 10 heterodynes with the desired beat frequency $F_b'$ (desired) of 8,540 cycles in the tuned circuit of the oscillating detector 12 and produces an audible beat $F_b''$ of 1,176 cycles in the output of the oscillating detector 12, which is the same as the error of −1,176 cycles in the frequency of the variable oscillator 2 previously noted. As pointed out hereinbefore, the lower beat frequency in the rectified output of the detector 10 is considerably attenuated by the tuned circuits of the oscillating detector 12 and hence does not interfere with a proper operation of the apparatus.

The trimmer control 17 associated with the variable oscillator 2 is now adjusted to change the frequency of the variable oscillator 2 upwardly until a beat frequency $F_b'$ (actual) of 8,540 cycles is produced in the output of the detector 10; and the agreement between this beat frequency and that of the desired beat frequency $F_b'$ (desired) of 8,540 cycles generated by the oscillating detector 12 is indicated by the device 16. The frequency of the variable oscillator 2 must then be the same as that indicated by the dials 3 and 9 plus or minus the following errors, namely, an error of 1.97 cycles in the reference standard 1, an error of 5 cycles in the oscillating detector 12 and an error of .10 of a cycle in the indicator 16. The total possible error, therefore, is 7.07 cycles if all the errors are cumulative, thus making the percentage error in terms of $F_0$ of the variable oscillator 2 approximately 3.6 parts in 1,000,000 cycles. By use of a double conversion arrangement to be described hereinafter in connection with the embodiment of Fig. 6, the error of the oscillating detector 12 may be reduced to the equivalent of 0.5 cycle over its range, thereby reducing the total error of the variable oscillator 2 to 1.3 parts in 1,000,000 cycles which is comparable with that of the reference standard 1.

The foregoing example shows that the frequency of the variable oscillator 2 depicted in Fig. 2 of the drawings can be checked and set to a high degree of accuracy and precison at any point in its frequency range with a speed and simplicity not approached by any other method at present known to the art. Errors caused by backlash in the control gears, non-linearity of frequency control and ambiguity of indication are so minimized as to make their magnitude comparable with those of the fixed reference standard. The accuracy of the fixed reference standard 1 then becomes the predominating factor.

As an additional feature of my invention depicted in Fig. 2, the frequency of the variable oscillator 2 may be adjusted to and maintained at the desired frequency setting of the dials by the use of an automatic oscillator frequency compensator 18, which operates in conjunction with the indicator 16 to compensate for any drift of the variable oscillator 2, as shown by the indicator 16. Such automatic frequency control means are well known to the art. One method which is applicable is the use of the variable resultant beat voltage produced in the rectified output of the detector 12 by changes in phase relation between the frequency of the oscillating detector 12 and that produced in the output of the detector 10 as a result of heterodyning the frequencies of the variable oscillator 2 and the reference standard 1. The rise and fall of the variable resultant beat voltage in the output of the oscillating detector 12, as the phase of the beat frequency of the detector 10 changes with reference to the beat frequency in the oscillating detector 12 is used to control the frequency of the variable oscillator 2 in such a direction as to compensate for phase changes caused by the frequency drift of the variable oscillator 2. Such a frequency compensator is disclosed in U. S. Patent No. 1,450,966 and may be used as the compensator 18 in Fig. 2.

Turning now to Fig. 6 of the drawings, there is shown depicted therein a still further embodiment of the apparatus of the present invention which, in its broad aspects of construction and operation, does not differ from the apparatus of Fig. 2 but which includes, among other things, certain refinements whereby the frequency range of the variable oscillator may be extended and the accuracy of the apparatus as a whole increased.

It may be noted, like in the embodiment of Fig. 2, the embodiment of Fig. 6 includes a variable oscillator 2, the frequency range of which may be extended by the use of one or more frequency multipliers and the desired frequency setting of which is indicated by the dials 3 and 9. The output of the variable oscillator 2 with or without frequency multiplication is again heterodyned with the output of the reference standard 1 to produce a beat frequency $F_b'$ (actual) in the rectified output 11 of the first detector 10. The higher beat frequency $F_b'$ (actual) in the rectified output 11 of the detector 10, like that in the embodiment of Fig. 2, varies from $F_s$ to $F_s/2$ and back to $F_s$ as the frequency of the variable oscillator 2 with or without multiplication is varied from one check frequency of the reference standard 1 to the next.

Instead of immediately heterodyning the higher beat frequency $F_b'$ (actual) in the rectified output of the detector 10 with the desired beat frequency $F_b'$ (desired) of the oscillating detector 12 as in Fig. 2, the frequency range of $F_b'$ (actual) in the rectified output of the first detector 10 is first reduced by some integral multiple so that the range of $F_b'$ (actual-reduced) will be $1/m(F_s$ to $F_s/2$ to $F_s)$ where $m$ is some integral multiple. This reduction in range of $F_b'$ (actual) in the rectified output of the first detector of Fig. 6 is achieved in any suitable manner as by heterodyning the output of a subharmonic generator 19 energized by the reference standard 1 with the output of the amplifier 20 energized by the first detector 10 to provide in the rectified output 22 of the second detector 21 $F_b'$ (actual-reduced) which varies throughout the range $1/m(F_s$ to $F_s/2$ to $F_s)$.

$F_b'$ (actual-reduced) in the output 22 of the second detector with or without amplification by the tuned amplifier 23 is then heterodyned with $F_b'$ (desired-reduced) of the oscillating detector 12 to produce a second beat frequency $F_b''$ in the output 13 of the detector 12 detectable by the indicator 16 when the actual frequency of the variable oscillator 2 differs from the desired frequency indicated by the dials 3 and 9. Since the frequency range of $F_b'$ (desired-reduced) in the oscillatory circuit of the detector 12 must be identical with the frequency range of $F_b'$ (actual-reduced), namely $1/m(F_s$ to $F_s/2$ to $F_s)$, the very important and beneficial result follows that for the same percentage error as in the detector 12 of Fig. 2, the error in the detector 12 of Fig. 6 is reduced to $1/m$ that of the detector in Fig. 2. This reduction in error obtained in the manner broadly outlined above increases the accuracy of the apparatus as a whole. How this is achieved will now be pointed out in detail with the foregoing preliminary remarks in view.

The variable oscillator 2 in Fig. 6 is a conventional vacuum tube oscillator which is shown for illustrative purposes as having a continuously variable frequency range of 2:1. The frequency range of the oscillator 2 is closely linear with respect to the angular rotation of the dial 9, this being achieved in any convenient manner known to the art, as by incorporation of a properly designed variable capacitor in the frequency determining circuit of the oscillator.

Where it is desired to extend the range of frequencies obtainable from the variable oscillator 2 one or more frequency multipliers of any convenient multiplying factor may be employed with the oscillator. For illustrative purposes, the frequency multipliers are shown as conventional doublers and as seven in number being designated by the reference characters 25, 26, 27, 28, 29, 30 and 31 respectively. The doubler 25 is excited by the variable oscillator 2 and has an output frequency which is always twice that fed into its input from the variable oscillator 2. The frequency variation of the doubler 25 is also closely linear with respect to the angular rotation of the dial 9, this being achieved in any suitable manner known to the art as by incorporating a properly designed variable capacitor in its frequency determining circuit. The remaining doublers 26, 27, 28, 29, 30 and 31 are similar in construction and operation with the doubler 25 and are arranged in cascade so that the output frequency of each is double that of the output frequency of the previous doubler. Thus, in the doubler construction depicted in Fig. 6, the output frequency of the doubler 31 is closely linear with respect to the angular rotation of the dial 9 and is 128 times that of the variable oscillator 2.

If, therefore, the frequency of the variable oscillator 2 is $F_o$, then the frequency of the doubler 31 is $128F_o$. Since the variable frequency range of the oscillator 2 is 2:1 at some point in the doubler cascade, there is available any desired output frequency from the lowest frequency in the range of the variable oscillator 2 to the highest frequency in the range of the doubler 31 provided the variable oscillator 2 is set on the proper frequency. Thus, a wide continuous range of frequencies is available from a single oscillator whose frequency range is only 2:1, the total frequency range of the doubler cascade being a function of the number of doublers employed.

In order to indicate the frequency ranges made available by the doubler construction described above, the dial 9 is provided with an outer circular scale that is calibrated linearly for the full range of the last doubler 31 and directly in check frequencies of the reference standard 1. Thus, when one division of the outer circular scale coincides with the index line inscribed on the casing of the variable oscillator 2, the frequency of the last doubler 31 by virtue of the construction described above should coincide with a check frequency of the reference standard 1. As the dial 9 is rotated an amount to cause the next division of the scale to coincide with the index line, the frequency of the doubler 31 will vary linearly to the next check frequency of the reference standard 1. Thus, as the dial 9 is moved through an angle corresponding to one division of its outer circular scale, the frequency of the doubler 31 will be changed by an amount $F_s$ which is the difference between adjacent check frequencies of the reference standard 1 as clearly indicated in Fig. 1 of the drawings. The dial 9 is also provided with a series of inner linear circular scales concentric with the outer scale, in the series of which an inner circular scale is provided for each of the remaining six doublers and the variable oscillator 2. Each of these inner concentric scales of the dial 9 will have a frequency range half or twice that of an adjacent scale as the case may be.

A shaft 32 to which the dial 9 is secured and a shaft 33 are connected to the rotors of the variable capacitors in the frequency controlling circuits of the doublers and the variable oscillator. This is a conventional form of ganged tuning control in which each successive circuit is tuned to twice the frequency of the preceding circuit at all points within the tuning range of each. The advantages of such a tuning arrangement are obvious from an operational viewpoint. The shafts 32 and 33 are rotated by the shaft 34 through reduction gears 4 which are of the worm gear type illustrated in Fig. 3 wherein worms on the shaft 34 mesh at right angles with split gear wheels on the shafts 32 and 33. The gear ratios of the reduction gears 4 are such that one revolution of the shaft 34 occasioned by manipulation of the hand wheel 35 will cause the frequency of the seventh doubler 31 to change by an amount $F_s$ and simultaneously therewith will cause the dial 9 to move through one division of its outer circular scale to indicate the change in frequency of the doubler 31 by an amount $F_s$.

The reference standard 1 is a fixed frequency source of very high stability and accuracy. The fundamental frequency of the standard 1 is about two orders below that of the doubler 31 and all higher order harmonics are present in its output up to and including those which fall within the frequency range of the doubler 31. In the embodiment of my invention depicted in Fig. 6 only those higher order harmonic frequencies of the reference standard 1 which fall within the output frequency range of the doubler 31 are used as check frequencies, but lower order harmonics within the frequency range of any or all of the lower order doublers may also be employed if desired.

The frequency converter 10 may be a detector of conventional design in which the generated frequencies of the doubler 31 and the reference standard 1 are heterodyned and in the rectified output of which the first beat frequency $F_b'$ (actual) is produced. As in the embodiment of Fig. 2, the higher beat frequency $F_b'$ (actual) is preferably utilized, this beat frequency varying from $F_s$ to $F_s/2$ and to $F_s$ as the frequency $F_o$ of the doubler 31 is varied from one check frequency of the reference standard to the next. The cycle of variation of the higher beat frequency is clearly indicated in Fig. 1 of the drawings.

Where it is desired or becomes necessary, the beat frequency in the rectified output 11 of the detector 10 may be amplified by employing a tuned amplifier whose cycle of frequency variation is linear and extends from $F_s$ to $F_s/2$ and back to $F_s$, this cycle of frequency variation being identical with the cycle of frequency variation of the higher beat frequency in the rectified output of the detector 10. This is conveniently accomplished by utilizing as a tuning control element in the tuned circuit of the amplifier 20 a variable capacitor of the type depicted in Fig. 4 and previously described herein to give the cycle of frequency variation disclosed in Fig. 5. The rotor of this variable capacitor is secured to the shaft 36 with the result that the circuit of the amplifier 20 is successively tuned in a linear fashion to amplify frequencies varying from $F_s$ to $F_s/2$ as the rotor turns from its 0° position to its 180° position and is successively tuned in a like linear fashion to amplify frequencies from $F_s/2$ back to $F_s$ as the rotor is turned from its 180° position to its 360° position. Thus, one revolution of the shaft 36 tunes the amplifier 20 through a frequency cycle essential to the amplification of the higher beat frequency in the output 11 of the detector 10. Rotation is imparted to the shaft 36 by the shaft 34 through the bevel gears 37 which have a 1:1 ratio. Thus, when the shafts 34 and 36 are properly phased or synchronized, one revolution of each of these shafts will cause the tuning of the amplifier 20 to track with the higher beat frequency $F_b'$ (actual) in the rectified output of the detector 10 and thus amplify the higher beat frequency.

Before heterodyning the amplified higher beat frequency $F_b'$ (actual) in the detector 12, its frequency range is first reduced by some integral multiple so that the range $F_b'$ (actual-reduced) will be $1/m(F_s$ to $F_s/2$ to $F_s)$ where $m$ is some integral multiple. This has the effect, as previously noted, of increasing the accuracy of the apparatus as a whole. The reduction in range of $F_b'$ (actual) may be achieved in any suitable manner. Purely by way of illustration, there is shown employed for this purpose a subharmonic generator 19 energized by the reference standard 1, the output of which is heterodyned with the output of the tuned amplifier 20 to produce in the output 22 of the second detector 21 $F_b'$ (actual-reduced) which varies throughout the range $1/m(F_s$ to $F_s/2$ to $F_s)$. The second detector 21 is of a construction similar to that of the first detector 10.

The subharmonic generator 19 is of a conventional construction and generates subharmonics of the fundamental $F_s$ of the reference standard 1. The magnitude of the frequency of the fundamental subharmonic, $1/m \times F_s$, may be chosen as desired and determines the accuracy of the apparatus as will become evident as the description proceeds. If $m$ is chosen as 10 for purposes of illustration, the frequency of the fundamental subharmonic will be $0.1F_s$ and the generator 19 will generate the following ten subharmonics, namely, $F_s$, $0.9F_s$, $0.8F_s$, $0.7F_s$, $0.6F_s$, $0.5F_s$, $0.4F_s$, $0.3F_s$, $0.2F_s$, $0.1F_s$.

The amplified beat frequency $F_b'$ (actual) in its cycle of frequency variation from $F_s$ to $F_s/2$ to $F_s$ will heterodyne with the first six subharmonics as check frequencies to produce a cycle of frequency variation of $1/10(F_s$ to $F_s/2$ to $F_s)$ in the rectified output 22 of the detector 21 as amplified $F_b'$ (actual) of the tuned amplifier is varied from one check frequency of the subharmonic generator 19 to another. Since ten check intervals of the subharmonic generator 19 are traversed in varying the frequency of the tuned amplifier 20 through one cycle, ten cycles of the reduced frequency variation $1/10(F_s$ to $F_s/2$ to $F_s)$ will be produced in the output 22 of the second detector for each cycle of frequency variation ($F_s$ to $F_s/2$ to $F_s$). Hence the shaft 38 to which the tuning element of the tuned amplifier 23 is secured must make ten revolutions for each revolution of shafts 34 and 36. In order that this may be accomplished, the shaft 38, which may optionally incorporate the clutch 39 to be described hereinafter, is driven from the shaft 34 by a 1:10 reduction gear 40. This reduction gear as shown may consist of two bevel gears. The use of the tuned amplifier 23 is purely optional and is similar in construction to the tuned amplifier 20 previously described except that its variable capacitor controlled by the shaft 38 is designed and phased to track with the reduced beat frequency $F_b'$ (actual-reduced) in its cycle of frequency variation of $1/10(F_s$ to $F_s/2$ to $F_s)$.

Since the shaft 38 makes ten revolutions for each revolution of shaft 34 the dial 3' rigidly secured thereto is provided with an outer circular linear scale calibrated to cover a frequency range of $1/10 \times F_s$ while dial 3, which is arranged to rotate with the same speed as shaft 34, is provided with an outer circular linear scale calibrated to cover a frequency range of $F_s$. In order that dial 3 may rotate with the same speed as shaft 34, the shaft 41 to which it is secured is driven by a 10:1 reduction gear 42 from the shaft 38. In a manner similar to dial 9, dials 3 and 3' are also provided with a series of inner linear circular scales concentric with the outer scale, in the series of which an inner scale is provided for each of the remaining six doublers and the variable oscillator 2 to indicate their proper frequency range.

It should thus be clear that the outer circular scales of the dials 9, 3 and 3' together indicate the frequency of the doubler 31. Thus, when the dials 3 and 3' read zero, $F_o$ of the doubler 31 should coincide with a check frequency of the reference standard 1 as indicated by the dial 9. One revolution of the shafts 34 and 41 accomplished by turning the hand wheel 35 through one revolution will turn dial 3 through its frequency range $F_s$ back to 0 and cause dial 9 to move through one division of its outer circular scale to indicate a change in frequency of the doubler 31 by the amount $F_s$. Simultaneously with the rotation of dials 3 and 9 the dial 3' will turn through ten revolutions. Thus, one revolution of dial 3 from one zero setting to the next should vary $F_o$ of the doubler 31 linearly to the next check frequency of the reference standard 1.

In order to detect any difference between the actual frequency of the variable doubler 31 and its desired frequency as indicated by the setting of the dials 9, 3 and 3', the amplified actual reduced beat frequency $F_b'$ (actual-reduced) in the output 43 of the tuned amplifier 23 is heterodyned with the desired-reduced beat frequency $F_b'$ (desired-reduced) in the tuned circuit of the detector 12. This desired-reduced beat frequency $F_b'$ (desired-reduced) in the tuned circuit of the detector 12 is the desired-reduced beat frequency that would be obtained in the output 22 of the detector 21 if the frequency of the variable doubler 31 were identical with the frequency indications of the dials 9, 3 and 3'. If a second beat frequency $F_b''$ is produced in the rectified output 13 of the detector 12, it is immediately known that the actual frequency of the variable doubler 31 differs from the desired frequency indicated by the dials 9, 3 and 3'.

The oscillating detector 12 of Fig. 6 is identical in construction and operation with that of Fig. 2 except that the frequency in its oscillatory circuit extends from $1/m(F_s$ to $F_s/2$ to $F_s)$ which is identical with the frequency range of $F_b'$ (actual-reduced) in the output 43 of the tuned amplifier 23. The variable capacitor of the detector 12 in Fig. 6 is thus designed with reference to the constants of the tuned circuit to produce a cycle of frequency variation from $1/m(F_s$ to $F_s/2$ to $F_s)$ for each revolution of the shaft 38 to which the rotor of the capacitor is rigidly but adjustably secured. Any suitable indicator 16 which is identical in construction with that of Fig. 2 may be employed in the output of the oscillating detector 12 for detecting the presence of the second beat frequency $F_b''$. If desired, an automatic frequency compensator 18 similar to that of Fig. 2 may be used in conjunction with the indicator 16 to automatically set the frequency of the variable oscillator 2 to the desired value and thus maintain the beat frequency $F_b''$ in the rectified output 13 of the oscillating detector 12 at a constant and predetermined value. Trimmer controls 44 and 45 are provided for both the variable oscillator 2 and the oscillating detector 12.

Before using the apparatus of Fig. 6 it is first adjusted in a manner to be presently described. Dial 9 as already explained is provided with an outer circular linear scale calibrated throughout the frequency range of the doubler 31 in subdivisions of the interval between adjacent check frequencies of the reference standard 1 while the outer circular scales of the dials 3 and 3' are calibrated respectively over the frequency ranges $F_s$ and $1/10 F_s$. The outer circular scales of dials 9, 3 and 3' together indicate the desired frequency of the doubler 31. With the outer scales of the dials 3 and 3' adjusted to read zero and with a graduation of the outer scale of dial 9 in coincidence with the index inscribed on the casing of the variable oscillator, the frequency controlling elements in the circuits of the variable oscillator 2 and the seven doublers are adjusted with reference to their respective shafts 32 and 33 to cause the frequency of the doubler 31 to coincide with a check frequency of the reference standard 1. Without disturbing the adjustment thus made, the frequency controlling element in the oscillatory circuit of the detector 12 is adjusted with reference to its shaft 38 to cause the desired reduced beat frequency $F_b'$ (desired-reduced) of the detector 12 to coincide with the actual reduced beat frequency $F_b'$ (actual-reduced) in the output circuit of the tuned amplifier 23. Coincidence between these two beat frequencies is indicated by the device 16.

With the apparatus of Fig. 6 constructed and adjusted in the manner heretofore described the higher reduced beat frequency $F_b'$ (actual-reduced) in the output of the detector 21 will coincide and track with the desired reduced beat frequency $F_b'$ (desired-reduced) in the detector 12 as dial 3' is turned through successive revolutions, provided the frequency of the doubler 31 is that indicated by the dials 9, 3 and 3'. Under these circumstances, the beat frequency $F_b''$ in the output 13 of the detector 12 will be zero and the device 16 will not give an indication. Should the actual frequency of the doubler 31, however, be different from the desired frequency as indicated by the dials 9, 3 and 3', this will be immediately evidenced by an indication of 16 since the beat frequency $F_b''$ now has a value other than zero. Coincidence between the actual and desired frequencies of the doubler 31 is thereupon automatically established by the frequency compensator 18 through control of the variable oscillator 2 all in a manner previously described herein in connection with the embodiment of Fig. 2. Where, however, an automatic frequency compensator is not employed, coincidence between the actual and desired frequencies of the doubler 31 may be established as by manipulation of the trimmer control 44 associated with the variable oscillator 2 which controls a conventional trimmer in the frequency determining circuit of the oscillator. These manual or automatic adjustments insure that the actual frequency of the doubler 31 is precisely that indicated by the dials 9, 3 and 3' to a degree of accuracy governed by the accuracy of the reference standard 1, the accuracy of the oscillating detector 12 and that of the indicator 16.

The frequency of the doubler 31 can, therefore, be set and maintained to a degree of accuracy which is the algebraic sum of the percentage errors of 1, 12 and 16 in terms of $F_o$ of the doubler 31. In the embodiment of Fig. 6, however, the error of the oscillating detector 12 is greatly reduced as compared with the error of this detector in the embodiment of Fig. 2. This is explained by the fact that the frequency range of $F_b'$ (desired-reduced) in the oscillatory circuit of the detector 12 must be identical with that of $F_b'$ (actual-reduced) in the output of the detector 21, namely, $1/m(F_s$ to $F_s/2$ to $F_s)$. From this it follows that for the same percentage error in the oscillating detector the error in the detector 12 of Fig. 6 is reduced to $1/m$ that of the detector 12 in Fig. 2. Thus, where the error in the oscillating detector of Fig. 2 was 5 cycles in the numerical example previously given, it is now 0.5 cycle in the embodiment of Fig. 6 since $1/m$ is taken as $1/10$. In the embodiment of Fig. 6 the percentage error in the frequency of the variable oscillator 2 and hence in the frequency of the doubler 31 due to the reference standard 1 is several times larger than that caused by either the oscillating detector 12 or the indicator 16. Hence the maximum percentage error of any desired frequency between $F_o$ and $256F_o$ of the doubler 31 approaches that of the reference standard 1.

As pointed out hereinbefore the shaft 38 instead of being fabricated as a single member may be fabricated in two sections as shown and made to rotate as a single member by means of the interposed clutch 39. The purpose of this construction is to enable the tuning of the doubler 31 by manipulation of the hand wheel 35 with the clutch 39 disengaged to match the frequency of the doubler 31 with some unknown frequency and thereby insure that the frequency setting of the doubler 31 may remain undisturbed and be subsequently ascertained. With the clutch 39 disengaged as described, limited independent tuning of the oscillating detector 12 and amplifier 23 is made possible by manipulation of the dial 3' until the indicator 16 shows the beat frequency $F_b''$ to be zero. When this is accomplished the combined readings of the dials 9, 3 and 3' will give the exact frequency to which the doubler 31 is set.

While the clutch 39 may be of any convenient construction it must be such as to prevent the dial 3' from being placed more than ½ of a revolution out of step with the shaft 34 and hence more than ½ of a revolution out of step with a single graduation of the dial 9. This is essential when it is remembered that the outer circular scale of the dial 9 is calibrated in multiples of $F_s$, that the outer circular scale of the dial 3' is calibrated over a range of $0.1F_s$ only and that the higher beat frequency of the second detector 21 whose frequency range is from $1/10(F_s$ to $F_s/2$ to $F_s)$ is used for heterodyning purposes with a beat frequency of like range in the oscillating detector 12.

The clutch 39 as shown in the drawings comprises two complementary members 46 and 47 secured to the respective shaft sections of the shaft 38 and are releasably connected by the spring biased latch 48. The latch slides in a splined groove 49 of the longer shaft section and has one terminal portion normally engaged in a recess 50 of the member 46 to lock the shaft sections for rotation. Another terminal portion of the latch 48 enables actuation of the latch against the bias of the spring and thus permits disengagement of the first terminal latch portion from the recess 50 of the clutch member 46 with ensuing relative rotation between the shaft sections.

The design of the clutch 39 is such that when it is engaged the shaft sections can only be connected in a fixed angular relation to each other which does not disturb the calibration or operation of the apparatus previously described. When the clutch 39 is disengaged, however, the shaft sections are free to revolve independently of each other not to exceed a relative angular displacement of a little less than 180° in either direction from their normal relative position shown in the drawings. This limited relative rotation of the shaft sections is achieved by providing the clutch members 46 and 47 with projecting portions 51 and 52 which are laterally engageable after the shaft sections are relatively displaced through an angle of a little less than 180° in either direction from their relative position shown in the drawings. By virtue of this construction dial 3' cannot be placed more than ½ revolution out of step with the shaft 34.

In Fig. 7 there is shown a preferred embodiment of a direct reading frequency mechanism of the present invention which may be employed as a substitute for the dials depicted in the apparatus of Fig. 6. The function of the mechanism of Fig. 7 is to provide a means for directly indicating the output frequency of the variable oscillator and each of the seven doublers in Fig. 6 to as many significant figures as may be required. As previously noted the arrangement of the dials in Fig. 6 is one in which multiple frequency scales are placed adjacent to each other on each dial so that a common index line indicates simultaneously the output frequency of the variable oscillator and each doubler stage. Where the readings of the proper scales on dials 3 and 3' must be added to that of the corresponding scale on dial 9 to find the frequency to the required number of significant places, fractional and therefore awkward quantities must be handled at most frequencies because of the harmonic relation between the scales.

The mechanism of Fig. 7 makes it possible to dispense with the dials 9, 3 and 3' of Fig. 6 and hence obviates the necessity for addition since the frequency of the variable oscillator and each doubler stage is indicated directly and completely on a single device or counter. In Fig. 7 the reference character 38 designates the same shaft as is depicted in Fig. 6, it being understood that the terminal portion of the shaft 38 of Fig. 7 is to displace the terminal portion of the shaft 38 in Fig. 6 and associated instrumentalities to the right of the tuned amplifier 23. The speed of rotation of the shaft 38 relative to the main frequency controlling shafts 32 and 33 of Fig. 6 is determined by the ratios of the reduction gears 4 and 40 as long as the clutch 39 is engaged. Since the frequency variation of the variable oscillator 2 and the oscillating detector 12 is linear with respect to the angular rotation of their control shafts, the frequency of the variable oscillator 2 and hence the frequency of the doubler 31 is a linear function of the rotation of the shaft 38.

The shaft 38 may be conveniently rotated by either the hand wheel 35 of Fig. 6 or by the hand wheel 53 depicted in Fig. 7. The frequency of the variable oscillator 2 is indicated directly and completely at any point in its range by the conventional cyclometer or revolution counter type of indicator 54 in Fig. 7. The shaft 55 of this indicator is driven by the shaft 38 through a suitable reduction gear 56 between these shafts. The ratio of the reduction gear 56 is such that when the revolution counter 54 is synchronized with the variable oscillator 2 so that the numbers on its dials indicate directly the output frequency of the oscillator at any point within its range, this synchronism is maintained throughout the range of tuning of the oscillator 2 as controlled by the hand wheel 53 through the shaft 38, the reduction gear 40, shaft 34, reduction gear 4, and the shaft 32.

The main shaft 57 is also driven by the shaft 38 through the reduction gear 56 in a manner such that its rotative speed is identical with that of the shaft 55. This shaft 57 serves to drive mechanical counters similar to that of 54 for each of the seven doublers. Thus, a counter 58 serves to indicate the output frequency of the first doubler directly and completely at any point in its range, this counter being driven by the shaft 59 through a reduction gear 60 with a ratio of 2:1 such that the shaft 59 rotates with exactly twice the speed of shaft 55. When the counter 58 is synchronized with the doubler 25 at any point in its frequency range this synchronism is maintained throughout the range of tuning of the doubler 25 because the frequency and the rate of change of the doubler 25 is twice that of the variable oscillator 2 at all times. It thus follows that the frequency indicated by the counter 58 and its rate of change are also twice those of the mechanical counter 54. Similar counters are provided for each of the remaining doublers and are synchronized to read the frequency of each. These counters are geared to and driven by the shaft 57 with reduction gears of proper ratio, this ratio doubling for each doubling of the frequency so that the gear ratio has the same number as the harmonic of the doubler whose counter it drives.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

I claim:

1. An apparatus for supplying a variable and ascertainable frequency comprising in combination a continuously variable source of frequency whose frequency output is substantially linear in response to adjustments of its frequency controlling element, a fixed frequency standard for producing harmonic check frequencies throughout the frequency range of the variable frequency source, heterodyning means associated with the variable frequency source and the frequency standard for producing a cycle of beat frequency as the frequency of the source is varied with respect to the check frequencies of the standard, means including a frequency controlling element for substantially duplicating the aforesaid cycle of beat frequency and for heterodyning any frequencies in these two cycles, means for simultaneously adjusting the frequency controlling elements of the variable frequency source and cycle duplicating means and for indicating the desired frequency of the variable frequency source, and means responsive to any beat frequency produced by heterodyning any frequencies in the two cycles of beat frequency for detecting any difference between the actual frequency of the variable frequency source and the desired frequency of its indicating means.

2. An apparatus for supplying a variable and ascertainable frequency comprising in combination a continuously variable source of frequency whose frequency output is substantially linear in response to adjustments of its frequency controlling element, a fixed frequency standard for producing harmonic check frequencies throughout the frequency range of the variable frequency source, heterodyning means associated with the variable frequency source and the frequency standard for producing a reduced cycle of beat frequency as the frequency of the source is varied with respect to the check frequencies of the standard, means including a frequency controlling element for substantially duplicating the aforesaid reduced cycle of beat frequency and for heterodyning any frequencies in these two cycles, means for simultaneously adjusting the frequency controlling elements of the variable frequency source and cycle duplicating means and for indicating the desired frequency of the variable frequency source, and means responsive to any beat frequency produced by heterodyning any frequencies in the two cycles of beat frequency for detecting any difference between the actual frequency of the variable frequency source and the desired frequency of its indicating means.

3. An apparatus for supplying a variable and ascertainable frequency comprising in combination a continuously variable oscillator whose frequency output is substantially linear in response to adjustments of its frequency controlling element, a fixed frequency standard for producing harmonic check frequencies throughout the frequency range of the variable oscillator, a detector in which the outputs of the oscillator and frequency standard are heterodyned to produce a cycle of beat frequency in the detector output as the frequency of the oscillator is varied from one check frequency of the reference standard to the next, a variable oscillating detector connected to the output of the first mentioned detector and including a frequency controlling element for substantially duplicating the aforesaid cycle of beat frequency for heterodyning purposes, means for simultaneously adjusting the frequency controlling elements of the variable oscillator and oscillating detector and for indicating the desired frequency of the variable oscillator, and means responsive to any beat frequency in the output of the oscillating detector for detecting any difference between the actual frequency of the variable oscillator and the desired frequency of its indicating means.

4. An apparatus for supplying a variable and ascertainable frequency comprising in combination a continuously variable source of frequency having a substantially linear frequency characteristic, a fixed frequency standard for producing harmonic check frequencies throughout the frequency range of the variable frequency source, heterodyning means associated with the variable frequency source and the frequency standard for producing a cycle of beat frequency as the frequency of the source is varied with respect to the check frequencies of the standard, means for producing a comparison cycle of beat frequency similar to the aforesaid cycle but corresponding to the desired settings of the variable frequency source with reference to the frequency standard, and means for detecting any phase displacement between the two cycles of beat frequency to thus indicate that the actual frequency of the variable source differs from the desired frequency setting of the same.

5. An apparatus for supplying a variable and ascertainable frequency comprising in combination a continuously variable source of frequency having a substantially linear frequency characteristic, a fixed frequency standard for producing harmonic check frequencies throughout the frequency range of the variable frequency source, heterodyning means associated with the variable frequency source and the frequency standard for producing a reduced cycle of beat frequency as the frequency of the source is varied with respect to the check frequencies of the standard, means for producing a comparison cycle of beat frequency similar to the aforesaid cycle but corresponding to the desired settings of the variable frequency source with reference to the frequency standard, and means for detecting any phase displacement between the two cycles of beat frequency to thus indicate that the actual frequency of the variable source differs from the desired frequency setting of the same.

6. An apparatus for supplying a variable and ascertainable frequency comprising in combination a continuously variable source of frequency whose frequency output is substantially linear in response to adjustments of its frequency controlling element, a fixed frequency standard for producing harmonic check frequencies throughout the frequency range of the variable frequency source, heterodyning means associated with the variable frequency source and the frequency standard for producing a cycle of beat frequency as the frequency of the source is varied with respect to the check frequencies of the standard, means including a frequency controlling element for producing a comparison cycle of beat frequency similar to the aforesaid cycle but corresponding to the desired settings of the variable frequency source with reference to the frequency standard, a mechanism for directly and completely indicating the desired frequency of the variable source, means for simultaneously adjusting the said mechanism and the frequency controlling elements of the variable source and comparison cycle producing means, and means for detecting any phase displacement between the two cycles of beat frequency to thus determine that the actual frequency of the variable source differs from the desired frequency setting of the same as indicated by its mechanism.

7. An apparatus for supplying a variable and ascertainable frequency comprising in combination a continuously variable source of frequency whose frequency output is substantially linear in response to adjustments of its frequency controlling element, a fixed frequency standard for producing harmonic check frequencies throughout the frequency range of the variable frequency source, heterodyning means associated with the variable frequency source and the frequency standard for producing a cycle of beat frequency as the frequency of the source is varied with respect to the check frequencies of the standard, means including a frequency controlling element for substantially duplicating the aforesaid cycle of beat frequency, means for independently adjusting the frequency controlling elements of the variable frequency source and cycle duplicating means within a limited range to permit an undisturbed setting of the variable source, and means for detecting phase coincidence between the two cycles of beat frequency to thus determine the frequency of the variable source to which it has been set.

8. An apparatus for supplying a variable and ascertainable frequency comprising in combination a continuously variable source of frequency whose frequency output is substantially linear in response to adjustments of its frequency controlling element, a fixed frequency standard for producing harmonic check frequencies throughout the frequency range of the variable frequency source, heterodyning means associated with the variable frequency source and the frequency standard for producing a reduced cycle of beat frequency as the frequency of the source is varied with respect to the check frequencies of the standard, means including a frequency controlling element for substantially duplicating the aforesaid cycle of beat frequency, means for independently adjusting the frequency controlling elements of the variable frequency source and cycle duplicating means within a limited range to permit an undisturbed setting of the variable source, and means for detecting phase coincidence between the two cycles of beat frequency to thus determine the frequency of the variable source to which it has been set.

9. An apparatus for supplying a variable and ascertainable frequency comprising in combination a continuously variable oscillator having a substantially linear frequency characteristic, at least one frequency multiplier connected to the output of the variable oscillator, a fixed frequency standard for producing harmonic check frequencies throughout the frequency range of the final frequency multiplier, heterodyning means associated with the final frequency multiplier and the frequency standard for producing a reduced cycle of beat frequency as the frequencies of the variable oscillator and the final frequency multiplier are varied with respect to the check frequencies of the standard, means for producing a comparison cycle of beat frequency similar to the aforesaid cycle but corresponding to the desired settings of the variable oscillator with reference to the frequency standard, and means for detecting any phase displacement between the two cycles of beat frequency to thus indicate that the actual frequency of the variable oscillator differs from the desired frequency of the same.

10. An apparatus for supplying a variable and ascertainable frequency comprising in combination a continuously variable oscillator whose frequency output is substantially linear in response to adjustments of its frequency controlling element, at least one frequency multiplier including a frequency controlling element connected to the output of the variable oscillator, a fixed frequency standard for producing harmonic check frequencies throughout the frequency range of the final frequency multiplier, heterodyning means associated with the final frequency multiplier and the frequency standard for producing a cycle of beat frequency as the frequencies of the variable oscillator and the final frequency multiplier are varied with respect to the check frequencies of the standard, means including a frequency controlling element for producing a comparison cycle of beat frequency similar to the aforesaid cycle but corresponding to the desired settings of the variable oscillator with reference to the frequency standard, a separate mechanism for the oscillator and each of the multipliers for directly and completely indicating their desired frequencies, means for simultaneously adjusting the said mechanisms and all of the aforesaid frequency controlling elements, and means for detecting any phase displacement between the two cycles of beat frequency to thus indicate that the actual frequency of the variable oscillator differs from the desired frequency of the same.

11. An apparatus for supplying a variable and ascertainable frequency comprising in combination a continuously variable source of frequency having a substantially linear frequency characteristic, a fixed frequency standard for producing harmonic check frequencies throughout the frequency range of the variable frequency source, heterodyning means associated with the variable frequency source and the frequency standard for producing a cycle of beat frequency as the frequency of the source is varied with respect to the check frequencies of the standard, means for producing a comparison cycle of beat frequency similar to the aforesaid cycle but corresponding to the desired settings of the variable frequency source with reference to the frequency standard, and means responsive to any phase displacement between the two cycles of beat frequency for automatically adjusting the frequency of the variable source to its desired frequency setting.

DUNDAS PREBLE TUCKER.